(12) United States Patent
Lee

(10) Patent No.: US 12,533,993 B2
(45) Date of Patent: Jan. 27, 2026

(54) BATTERY MANAGEMENT SYSTEM FOR ELECTRIFIED VEHICLE AND METHOD FOR DIAGNOSING BATTERY THEREOF

(71) Applicants: Hyundai Motor Company, Seoul (KR); Kia Corporation, Seoul (KR)

(72) Inventor: Jung Hyun Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 678 days.

(21) Appl. No.: 17/952,608

(22) Filed: Sep. 26, 2022

(65) Prior Publication Data
US 2023/0331118 A1    Oct. 19, 2023

(30) Foreign Application Priority Data
Apr. 13, 2022 (KR) .................. 10-2022-0045852

(51) Int. Cl.
*B60L 58/22* (2019.01)
*B60L 3/00* (2019.01)
*G01R 31/36* (2020.01)
*H01M 10/42* (2006.01)

(52) U.S. Cl.
CPC ............ *B60L 58/22* (2019.02); *B60L 3/0046* (2013.01); *G01R 31/3646* (2019.01); *G01R 31/3648* (2013.01); *H01M 10/425* (2013.01); *H01M 2010/4271* (2013.01); *H01M 2220/20* (2013.01)

(58) Field of Classification Search
CPC ....... H01M 2010/4271; H01M 10/425; H01M 2220/20; B60L 3/0046; B60L 3/12; B60L 58/10; B60L 58/22; B60L 2240/547; B60L 2250/10; G01R 31/3646; G01R 31/3648; G01R 31/382; G01R 31/392; G01R 31/396; B60Y 2200/91; B60Y 2200/92; Y02T 10/62; Y02T 10/70; Y02T 10/72
USPC ......................................................... 320/109
See application file for complete search history.

(56) References Cited

U.S. PATENT DOCUMENTS

| | | | |
|---|---|---|---|
| 9,097,774 B2 | 8/2015 | White et al. | |
| 9,465,084 B2* | 10/2016 | Park ..................... | G01R 31/392 |
| 10,790,677 B2* | 9/2020 | Nam ..................... | G01R 31/396 |
| 11,056,896 B2* | 7/2021 | Zhang ................... | H02J 7/0063 |
| 11,422,193 B2* | 8/2022 | Hansen ................ | H01M 10/425 |
| 11,460,511 B2* | 10/2022 | Kim ..................... | G01R 31/392 |

(Continued)

FOREIGN PATENT DOCUMENTS

| | | | | |
|---|---|---|---|---|
| CN | 107856559 A | * | 3/2018 | ............... B60L 8/14 |
| JP | 2003134685 A | * | 5/2003 | ............. Y02E 60/10 |

(Continued)

*Primary Examiner* — M Baye Diao
(74) *Attorney, Agent, or Firm* — Fox Rothschild LLP

(57) ABSTRACT

A battery management system for an electrified vehicle configured to diagnose an abnormal behavior of a battery using a cell balancing function, and a method for diagnosing a battery thereof, are provided. The battery management system comprises a processor that is configured to monitor a battery. The processor is further configured to perform primary cell balancing, when a battery cell voltage deviation meets a cell balancing entry condition, determine whether an abnormal cell voltage deviation occurs after the primary cell balancing, and diagnose a progressive voltage drop using (N+1)th-order cell balancing, when it is determined that the abnormal cell voltage deviation occurs.

16 Claims, 6 Drawing Sheets

(56) References Cited

U.S. PATENT DOCUMENTS

| | | | |
|---|---|---|---|
| 11,505,088 B2 * | 11/2022 | Choi | H01M 10/425 |
| 11,631,980 B2 * | 4/2023 | Kim | H02J 7/0016 |
| | | | 320/128 |
| 11,656,292 B2 * | 5/2023 | Yoon | G01R 31/392 |
| | | | 324/426 |
| 12,142,954 B2 * | 11/2024 | Kanai | G01R 31/382 |
| 2017/0219657 A1 * | 8/2017 | Vovos | G01R 31/396 |
| 2018/0269694 A1 * | 9/2018 | Nam | G08B 21/18 |
| 2020/0072912 A1 | 3/2020 | Chun et al. | |
| 2020/0166582 A1 | 5/2020 | Mensler et al. | |
| 2021/0098998 A1 * | 4/2021 | Eo | G01R 31/3835 |
| 2021/0396817 A1 | 12/2021 | Dandl et al. | |
| 2021/0408804 A1 * | 12/2021 | Kanai | H01M 10/425 |
| 2022/0155378 A1 | 5/2022 | Lee | |
| 2022/0390520 A1 * | 12/2022 | Park | H01M 10/42 |

FOREIGN PATENT DOCUMENTS

| | | | | |
|---|---|---|---|---|
| KR | 101865402 B1 | | 7/2018 | |
| KR | 10-2020-0024637 A | | 3/2020 | |
| KR | 10-2020-0032124 A | | 3/2020 | |
| KR | 20200135046 A | * | 12/2020 | ............ H02J 7/0014 |
| KR | 10-2021-0011236 A | | 2/2021 | |
| KR | 10-2021-0040123 A | | 4/2021 | |
| KR | 10-2021-0050396 A | | 5/2021 | |
| KR | 10-2021-0145024 A | | 12/2021 | |
| TW | 490871 B | * | 6/2002 | ............ H02J 7/0014 |

* cited by examiner

BATTERY MANAGEMENT SYSTEM FOR ELECTRIFIED VEHICLE AND METHOD FOR DIAGNOSING BATTERY THEREOF

CROSS-REFERENCE TO RELATED APPLICATION(S)

This application claims, under 35 U.S.C. § 119(a), the benefit of priority to Korean Patent Application No. 10-2022-0045852, filed in the Korean Intellectual Property Office on Apr. 13, 2022, the disclosure of which is incorporated herein by reference in its entirety.

BACKGROUND

Technical Field

Embodiments of the present disclosure relate to a battery management system for an electrified vehicle for diagnosing an abnormal behavior of a battery using a cell balancing function and a method for diagnosing a battery thereof.

Description of the Related Art

A high voltage battery may be loaded into an electrified vehicle, such as an electric vehicle (EV), a hybrid electric vehicle (HEV), or a plug-in hybrid electric vehicle (PHEV). Technologies for high density and high energy of the high voltage battery have been developed to reduce a space where the high voltage battery is occupied in a limited space, such as a vehicle, and increase the capacity of the high voltage battery.

Battery safety is becoming more and more important as a critical situation (e.g., fire or the like) may arise, depending on the high density and the high energy of the high voltage battery. Thus, battery monitoring logic for battery safety is applied to electrified vehicles. However, existing battery monitoring logic has been insufficient in detecting an abnormal behavior of the battery and preventing the critical situation from occurring.

SUMMARY

The present disclosure has been made to solve the above-mentioned problems occurring in the prior art while advantages achieved by the prior art are maintained intact.

An aspect of the present disclosure provides a battery management system for an electrified vehicle for previously diagnosing a battery cell showing an abnormal behavior using a cell balancing function applied to balance a voltage deviation of a high voltage battery and a method for diagnosing a battery thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a battery management system for an electrified vehicle may comprise a processor that monitors a battery. The processor may be configured to perform primary cell balancing, when a battery cell voltage deviation meets a cell balancing entry condition, may be configured to determine whether an abnormal cell voltage deviation occurs after the primary cell balancing, and may be configured to diagnose a progressive voltage drop using (N+1)th-order cell balancing, when it is determined that the abnormal cell voltage deviation occurs.

The processor may be configured to determine whether the abnormal cell voltage deviation occurs based on a cell voltage deviation when entering the primary cell balancing and a cell voltage deviation when ending the primary cell balancing.

The processor may be configured to determine whether the abnormal cell voltage deviation occurs based on a cell voltage deviation when entering the (N+1)th-order cell balancing and a cell voltage deviation when ending the (N+1)th-order cell balancing after the (N+1)th-order cell balancing.

The processor may be configured to count the number of times cell balancing is checked, when it is determined that the abnormal cell voltage deviation occurs after the (N+1)th-order cell balancing.

The processor may be configured to determine that the progressive voltage drop occurs, when the number of times the cell balancing is checked is greater than the target number of times cell balancing is checked.

The processor may be configured to identify whether a battery cell having a minimum cell voltage after the primary cell balancing and a battery cell having the minimum cell voltage after the (N+1)th-order cell balancing are identical to each other and detects a bad cell based on the identified result.

The processor may be configured to output a warning, when it is diagnosed that the progressive voltage drop occurs.

According to another aspect of the present disclosure, a method for diagnosing a battery of a battery management method for an electrified vehicle may comprise performing, by a processor, primary cell balancing, when a battery cell voltage deviation meets a cell balancing entry condition, determining, by the processor, whether an abnormal cell voltage deviation occurs after the primary cell balancing, and diagnosing, by the processor, a progressive voltage drop using (N+1)th-order cell balancing, when it is determined that the abnormal cell voltage deviation occurs.

The determining of whether the abnormal cell voltage deviation occurs after the primary cell balancing may comprise determining, by the processor, whether the abnormal cell voltage deviation occurs based on a cell voltage deviation when entering the primary cell balancing and a cell voltage deviation when ending the primary cell balancing.

The diagnosing of the progressive voltage drop may comprise determining, by the processor, whether the abnormal cell voltage deviation occurs based on a cell voltage deviation when entering the (N+1)th-order cell balancing and a cell voltage deviation when ending the (N+1)th-order cell balancing after the (N+1)th-order cell balancing.

The diagnosing of the progressive voltage drop may comprise counting, by the processor, the number of times cell balancing is checked, when it is determined that the abnormal cell voltage deviation occurs after the (N+1)th-order cell balancing, and comparing, by the processor, the number of times the cell balancing is checked with the target number of times cell balancing is checked.

The diagnosing of the progressive voltage drop may comprise determining, by the processor, that the progressive voltage drop occurs, when the number of times the cell balancing is checked is greater than the target number of times the cell balancing is checked.

The diagnosing of the progressive voltage drop may comprise identifying, by the processor, whether a battery cell having a minimum cell voltage after the primary cell balancing and a battery cell having the minimum cell voltage after the (N+1)th-order cell balancing are identical to each other and detecting, by the processor, a bad cell based on the identified result.

The method may further comprise outputting, by the processor, a warning, when it is diagnosed that the progressive voltage drop occurs.

In further aspects, vehicles are provided, including electrified vehicles (e.g. an electric vehicle (EV), a hybrid electric vehicle (HEV), or a plug-in hybrid electric vehicle (PHEV)) that comprise a battery management system as disclosed herein. In one aspect, an electrified vehicle is provide that comprises a battery management system that comprises: (a) a processor configured to: (i) monitor a battery; (ii) perform primary cell balancing, when a battery cell voltage deviation meets a cell balancing entry condition; (iii) determine whether an abnormal cell voltage deviation occurs after the primary cell balancing; and (iv) diagnose a progressive voltage drop using (N+1)th-order cell balancing, when it is determined that the abnormal cell voltage deviation occurs.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
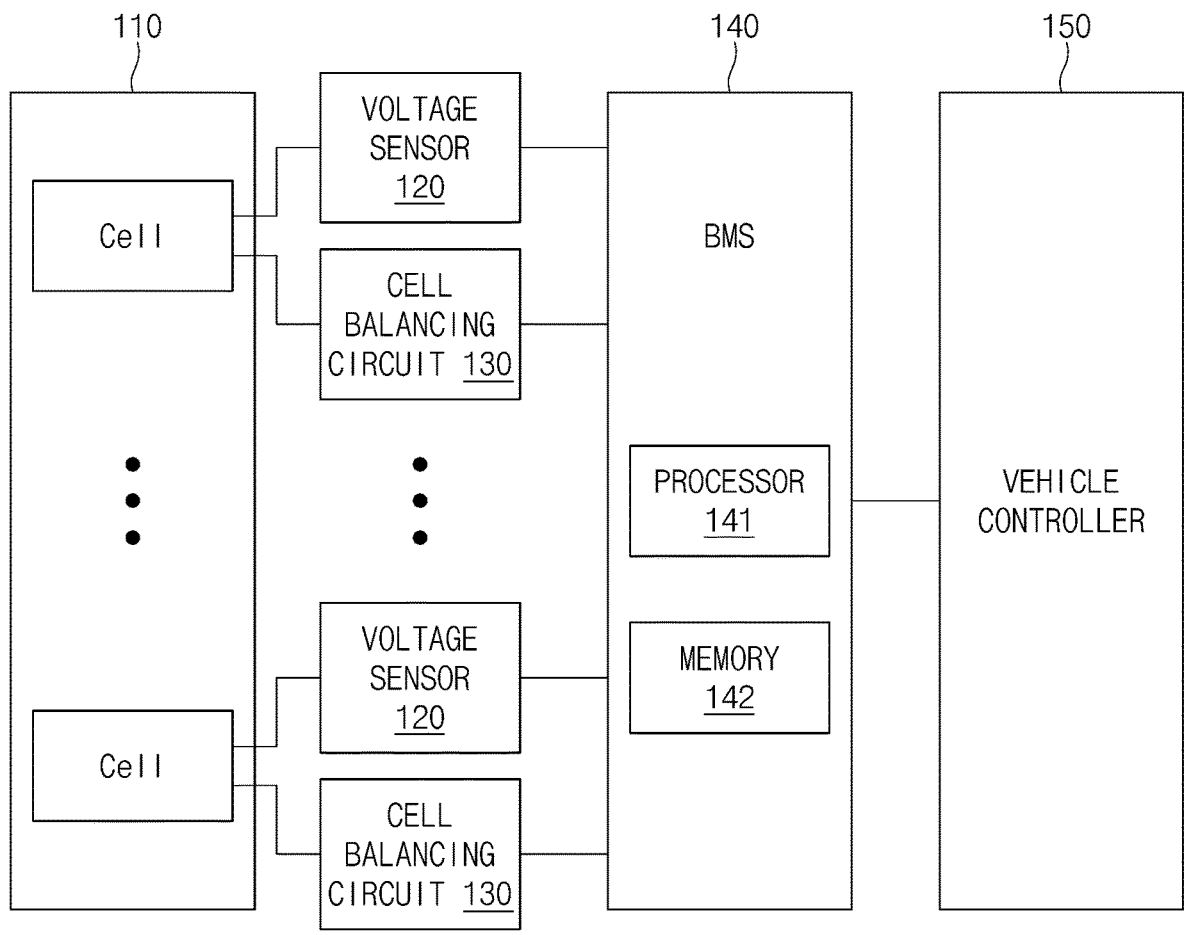
FIG. 1 is a block diagram illustrating a configuration of a battery system according to exemplary embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In particular aspect, the vehicle is an electrified vehicle, for example an electric vehicle (EV), a hybrid electric vehicle (HEV), or a plug-in hybrid electric vehicle (PHEV).

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a battery system according to embodiments of the present disclosure.

A battery system 100 may be loaded into an electrified vehicle, such as an electric vehicle (EV), a hybrid electric vehicle (HEV), or a plug-in hybrid electric vehicle (PHEV), which travels using an electric motor. Referring to FIG. 1, the battery system 100 may comprise a battery 110, a voltage sensor 120, a cell balancing circuit 130, a battery management system (BMS) 140, and a vehicle controller 150.

The battery 110 may be configured to supply electrical energy to a drive motor mounted on the vehicle. The battery 110 may be a high voltage battery which stores high-voltage electrical energy. The battery 110 may comprise a plurality of battery cells connected with each other in series and/or in parallel. The battery 110 may be implemented as a lithium-ion battery or the like.

The voltage sensor 120 may be connected with each of the plurality of battery cells. The voltage sensor 120 may be configured to measure a voltage (or a cell voltage) of each battery cell. The voltage sensor 120 may be configured to transmit the measured cell voltage to the BMS 140.

The cell balancing circuit 130 may be configured to serve to reduce a voltage deviation between the plurality of battery cells. The cell balancing circuit 130 may be connected with each battery cell and may be configured to discharge electrical energy stored in the connected battery cell to reduce a cell voltage. The case where the cell balancing circuit 130 is configured to be connected with each battery cell is described as an example, but not limited thereto. The cell balancing circuit 130 may be changed in design to be configured for each battery pack or each battery module.

The BMS 140 may be configured to monitor a state (e.g., a voltage, a current, a temperature, a state of charge (SOC), and the like) of the battery 110 using sensors such as a current sensor and a temperature sensor other than the voltage sensor 120. As an example, the BMS 140 may be configured to monitor a cell voltage deviation in the battery 110 and a change in cell voltage and cell temperature, while the battery 110 is charged or during parking. The BMS 140 may be configured to diagnose (or detect) an abnormal behavior (or a progressive voltage drop) of the battery 110 through the monitoring. Herein, the abnormal behavior of the battery 110 may be mainly indicated as a voltage deviation between cells by a bad cell or abnormal deterioration.

The BMS 140 may comprise a processor 141 and a memory 142. The processor 141 may be configured to control the overall operation of the BMS 140. The processor 141 may be implemented as at least one of processing devices such as an application specific integrated circuit (ASIC), a digital signal processor (DSP), a programmable logic device (PLD), a field programmable gate array (FPGA), a central processing unit (CPU), a microcontroller, and/or a microprocessor. The memory 142 may be a non-transitory storage medium which stores instructions executed by the processor 141. The memory 142 may be implemented as at least one of storage media (recording media) such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM). The BMS 140 may comprise an interface (not shown) which assists in transmitting and receiving data (or a signal or the like) with the voltage sensor 120, the cell balancing circuit 130, and the like. Furthermore, the BMS 140 may comprise a communication circuit (not shown) which assists with communication with the vehicle controller 150.

Progressive voltage drop diagnosis logic according to a battery defect (e.g., an internal short circuit) may be applied to the BMS 140 using a cell balancing function. The progressive voltage drop diagnosis logic is logic for previously detecting occurrence of a defect such as a fine internal short circuit even in a battery cell which does not still reach a problem level and diagnosing the defect of the battery cell before developing into a dangerous stage, as compared with existing battery monitoring logic for determining whether a battery state is abnormal at the moment of diagnosing the battery state. Herein, the progressive voltage drop may be referred to as an abnormal behavior of the battery 110.

The processor 141 of the BMS 140 may be configured to detect cell voltages of respective battery cells using the voltage sensors 120, when the battery 110 is charged or during parking. The processor 141 may be configured to calculate a cell voltage deviation between the detected cell voltages. For example, the processor 141 may be configured to calculate a difference (or a deviation) between a minimum cell voltage and a maximum cell voltage among the detected cell voltages. The processor 141 may be configured to compare the calculated cell voltage deviation with a reference cell voltage deviation stored in the memory 142. The reference cell voltage deviation may be a criterion of determining whether to enter cell balancing.

When the calculated cell voltage deviation is not greater than the reference cell voltage deviation, the processor 141 may be configured to determine not to enter primary cell balancing. Meanwhile, when the calculated cell voltage deviation is greater than the reference cell voltage deviation, the processor 141 may be configured to determine to enter the primary cell balancing. At this time, the processor 141 may be configured to store the calculated cell voltage deviation as an initial cell voltage deviation $\Delta V_{initial}$ in the memory 142. Herein, the initial cell voltage deviation may also be referred to as a cell voltage deviation when entering cell balancing. Furthermore, the processor 141 may be configured to calculate a time (i.e., a cell balancing end time) for balancing a cell voltage deviation of the battery 110 to a target cell voltage deviation. The target cell voltage deviation may be a criterion of determining whether to end cell balancing.

When it is determined to enter the primary cell balancing, the processor 141 may be configured to perform the primary cell balancing using the cell balancing circuit 130 until the calculated cell balancing end time (i.e., the primary cell balancing end time). The processor 141 may be configured to control the cell balancing circuit 130 to discharge a battery cell having a cell voltage higher than the minimum cell voltage, thus reducing a cell voltage of the battery cell.

When a current time reaches the primary cell balancing end time, the processor 141 may be configured to normally end the primary cell balancing. When the primary cell balancing is ended, the processor 141 may be configured to identify (or detect) a voltage of each battery cell using each of the voltage sensors 120. The processor 141 may be configured to calculate a cell voltage deviation $\Delta V_{finish}$ when the cell balancing is ended, using the identified voltage of each battery cell.

When the primary cell balancing is ended because the processor 141 reaches a separate end condition such as occurrence of a fault or the like, the processor 141 may fail to refer to a cell voltage deviation. When the primary cell balancing is not normally ended, the processor 141 may fail to count the number of times N' cell balancing is checked and may be configured to reset the number of times N the cell balancing is performed to "0".

When the primary cell balancing is normally ended, the processor 141 may be configured to determine whether an abnormal cell voltage deviation (e.g., a continuous minimum cell voltage drop or the like) occurs based on the initial cell voltage deviation, that is, the cell voltage deviation when entering the cell balancing and the cell voltage deviation when ending the cell balancing. As an example, when the cell voltage deviation when entering the cell balancing (i.e., the initial cell voltage deviation $\Delta V_{initial}$) is less than or equal to k times the cell voltage deviation when ending the cell balancing, the processor 141 may be configured to determine that the abnormal cell voltage deviation occurs. As an example, when the cell voltage deviation when entering the cell balancing is greater than k times the cell voltage deviation when ending the cell balancing, the processor 141 may be configured to determine that the abnormal cell voltage deviation does not occur. Here, k may be a constant.

When it is determined the abnormal cell voltage deviation occurs after the primary cell balancing, the processor 141 may be configured to count the number of times N' the cell balancing is checked. Furthermore, the processor 141 may be configured to store information (or first battery cell information) about a battery cell having a minimum cell voltage among the plurality of battery cells in the memory 142. Herein, the information about the battery cell may be information capable of identifying the battery cell, which may be a cell number or the like.

The processor 141 may be configured to perform (N+1)th-order cell balancing. At this time, the processor 141 may be configured to increase the number of times N the cell balancing is performed. In other words, the processor 141 may be configured to increase the number of times N the cell balancing is performed by +1.

The processor 141 may be configured to calculate an (N+1)th-order cell balancing end time with regard to a current battery cell voltage deviation when initiating the (N+1)th-order cell balancing (i.e., a cell voltage deviation when entering the (N+1)th-order cell balancing) and a target cell voltage deviation. When the (N+1)th-order cell balancing proceeds until the (N+1)th-order cell balancing end time, the processor 141 may normally end the cell balancing.

When normally ending the (N+1)th-order cell balancing, the processor 141 may be configured to compare the cell voltage deviation when entering the (N+1)th-order cell balancing with the cell voltage deviation when ending the (N+1)th-order cell balancing. When the cell voltage deviation when entering the (N+1)th-order cell balancing is less than or equal to k times the cell voltage deviation when ending the (N+1)th-order cell balancing, the processor 141 may be configured to count the number of times N' the cell balancing is checked. Furthermore, the processor 141 may be configured to store information (or second battery cell information) about a battery cell having the minimum cell voltage after the (N+1)th-order cell balancing in the memory 142. When the cell voltage deviation when enters the (N+1)th-order cell balancing is greater than k times the cell voltage deviation when ending the (N+1)th-order cell balancing, the processor 141 may fail to count the number of times N' the cell balancing is checked.

The processor 141 may be configured to compare the battery cell having the minimum cell voltage after the primary cell balancing with the battery cell having the minimum cell voltage after the (N+1)th-order cell balancing. In other words, the processor 141 may be configured to compare the first battery cell information stored in the memory 142 with the second battery cell information stored in the memory 142. When the first battery cell information and the second battery cell information are the same as each other, the processor 141 may be configured to compare the number of times N' the cell balancing is checked with the predetermined the target number of times cell balancing is checked. When the number of times N' the cell balancing is checked is greater than the target number of times the cell balancing is checked, the processor 141 may be configured to determine that it is expected that an abnormal cell voltage drop will occur. When the number of times N' the cell balancing is checked is not greater than the target number of times the cell balancing is checked, the processor 141 may be configured to determine that it is not expected that the abnormal cell voltage drop will occur. The processor 141 may be configured to increase each of the number of times N' the cell balancing is checked and the number of times N the cell balancing is performed by +1 to repeatedly perform cell balancing.

When the first battery cell information and the second battery cell information are not the same as each other, the processor 141 may be configured to reset the number of times N' the cell balancing is checked and the number of times the cell balancing is performed. For example, the processor 141 may be configured to reset each of the number of times N' the cell balancing is checked and the number of times N the cell balancing is performed to "1". The processor 141 may be configured to perform the (N+1)th-order cell balancing again.

When it is expected that the abnormal cell voltage drop will occur, the processor 141 may be configured to perform voltage drop monitoring (VdM) diagnosis. The VdM diagnosis may be performed, when the minimum cell temperature is greater than or equal to a target temperature (e.g., the minimum temperature ≥25° C.) and when the battery SOC is greater than or equal to a target SOC (e.g., SOC≥30%), when entering and ending cell balancing. As such, the processor 141 may consider a possibility that the cell voltage deviation will excessively occur in a low-temperature and low-SOC area.

The processor 141 may be configured to request the vehicle controller 150 to output a warning message and/or turn on a warning light, or the like depending on the result of the VdM diagnosis. Furthermore, the processor 141 may be configured to request vehicle control such as a limitation in battery performance (e.g., a limitation in charging) from the vehicle controller 150.

The vehicle controller 150 may be configured to transmit and receive data with the BMS 140 over a vehicle network. Herein, the vehicle network may be implemented as a controller area network (CAN), FlexRay, a media oriented systems transport (MOST), a local interconnect network (LIN), an Ethernet, and/or the like. The vehicle controller 150 may be configured to control the overall operation of the vehicle. The vehicle controller 150 may be configured to output a warning message and/or turn on a warning light on a cluster, audio video navigation (AVN), and/or the like depending on the request of the BMS 140. Furthermore, the vehicle controller 150 may be configured to limit battery performance (e.g., charging or the like) and/or vehicle performance.

Figure 2:
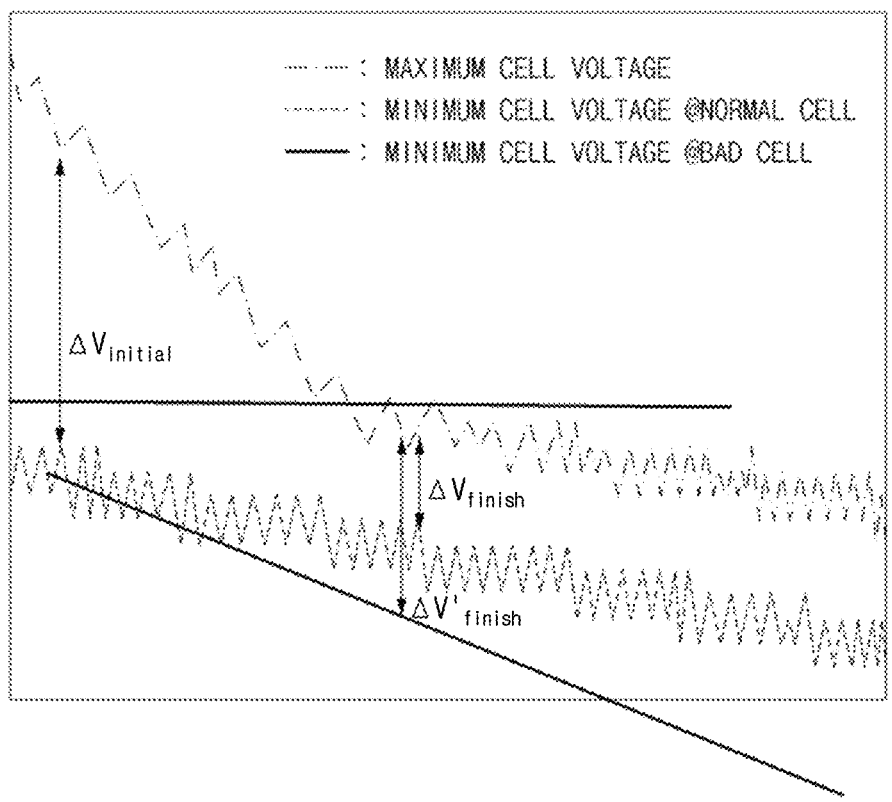
FIG. 2 is a graph illustrating a change in cell voltage in a cell balancing mode according to exemplary embodiments of the present disclosure.

FIG. 2 is a graph illustrating a change in cell voltage in a cell balancing mode according to embodiments of the present disclosure.

A BMS 140 of FIG. 1 may be configured to detect cell voltages of respective battery cells and may be configured to enter the cell balancing mode when a cell voltage deviation more increases than a target cell voltage deviation with respect to the lowest cell voltage among the detected cell voltages. In other words, when a deviation between the minimum cell voltage and the maximum cell voltage, that is, an initial cell voltage deviation $\Delta V_{initial}$ is greater than the target cell voltage deviation, the BMS 140 may be configured to perform cell balancing.

After the cell balancing is completed, the BMS 140 may be configured to detect a cell voltage of each battery cell and may be configured to calculate a cell voltage deviation. When the battery cell having the minimum cell voltage is normal, a cell voltage deviation $\Delta V_{finish}$ after the cell balancing is completed may be reached within the target cell voltage deviation. However, when the battery cell having the minimum cell voltage is bad, as a cell voltage drop occurs due to an internal fine short circuit or the like of the battery 110, a cell voltage deviation $\Delta V'_{finish}$ after the cell balancing is completed does not reach the target cell voltage deviation. Thus, the BMS 140 may be configured to determine whether the minimum cell voltage drops continuously with regard to a change in cell voltage deviation after the cell balancing is completed. As an example, the BMS 140 may be configured to identify whether the initial cell voltage deviation $\Delta V_{initial}$ when the cell balancing is initiated is less than k times the cell voltage deviation $\Delta V_{finish}$ after the cell balancing is completed to determine whether a progressive cell voltage drop occurs. As an example, when the initial cell voltage deviation $\Delta V_{initial}$ is less than k times the cell voltage deviation $\Delta V_{finish}$ after the cell balancing is completed, the BMS 140 may be configured to determine that the progressive cell voltage drop occurs. As another example, the BMS 140 may be configured to determine whether the cell voltage deviation $\Delta V_{finish}$ after the cell balancing is completed is less than a predetermined specific cell voltage to determine whether the progressive cell voltage drop occurs. When the cell voltage deviation $\Delta V_{finish}$ after the cell balancing is completed is greater than the predetermined specific cell voltage, the BMS 140 may be configured to determine that the progressive cell voltage drop occurs.

Figure 3A:
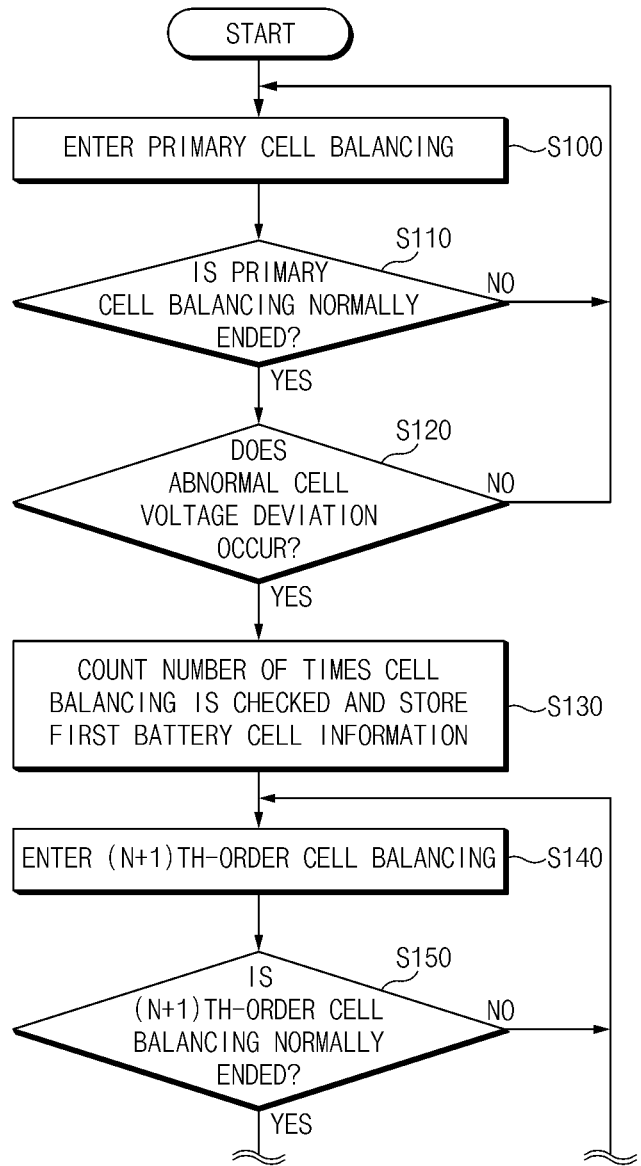
FIGS. 3A and 3B is a flowchart illustrating a method for diagnosing a battery according to an exemplary embodiment of the present disclosure.
Figure 3B:
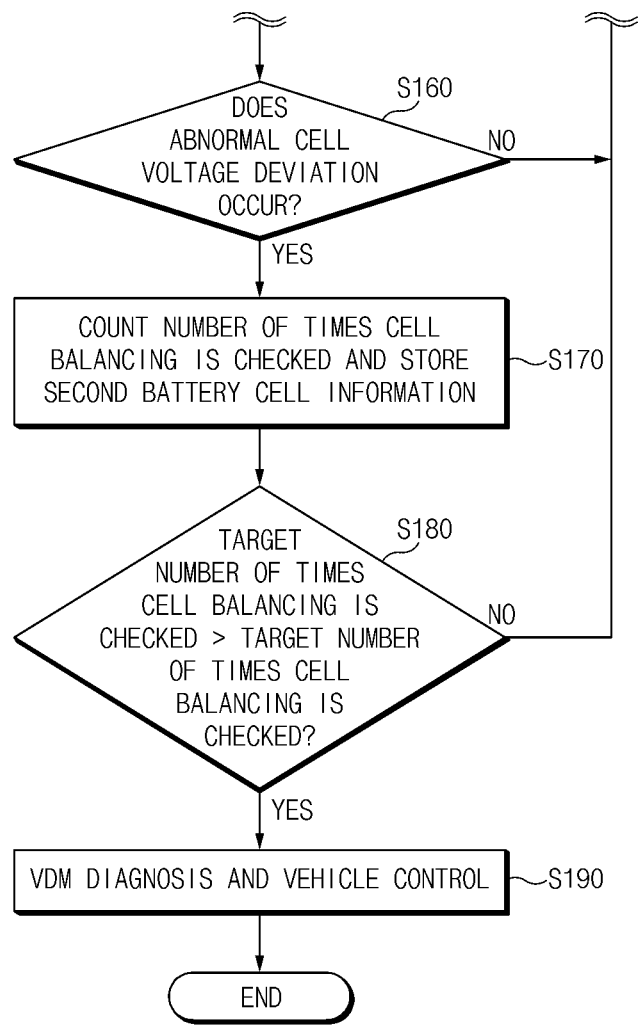

FIGS. 3A and 3B is a flowchart illustrating a method for diagnosing a battery according to an embodiment of the present disclosure.

In S100, a processor 141 of a BMS 140 of FIG. 1 may enter primary cell balancing. When a vehicle charges a battery 110 of FIG. 1 or is parked, the processor 141 may be configured to detect cell voltages of a plurality of battery cells in the battery 110. The processor 141 may be configured to calculate an initial cell voltage deviation using the detected cell voltages. For example, the processor 141 may be configured to calculate a deviation between a minimum cell voltage and a maximum cell voltage among the detected cell voltages. The processor 141 may be configured to compare the calculated initial cell voltage deviation with a reference cell voltage deviation stored in a memory 142 of FIG. 1. When the initial cell voltage deviation is greater than the reference cell voltage deviation, the processor 141 may be configured to determine to enter the primary cell balancing. When the initial cell voltage deviation is less than the reference cell voltage deviation, the processor 141 may be configured to determine not to enter the primary cell balancing. Herein, the reference cell voltage deviation may be a criterion of determining whether to enter cell balancing, which may be predetermined by a system designer. Furthermore, the processor 141 may be configured to calculate a primary cell balancing end time based on the initial cell voltage deviation when entering the primary cell balancing and a target cell voltage deviation. The target cell voltage deviation may be preset based on a test result or the like, which may be used as a criterion of determining whether the cell balancing is ended.

In S110, the processor 141 may be configured to identify whether the primary cell balancing is normally ended. When the primary cell balancing is ended in the primary cell balancing end time, the processor 141 may be configured to determine that the primary cell balancing is normally ended. When the primary cell balancing is ended before the primary cell balancing end time, the processor 141 may be configured to determine that the primary cell balancing is abnormally ended.

When it is identified that the primary cell balancing is normally ended in S110, in S120, the processor 141 may be configured to determine whether an abnormal cell voltage deviation occurs. The processor 141 may be configured to recalculate a cell voltage deviation after the primary cell balancing is normally ended. The processor 141 may be configured to determine whether the abnormal cell voltage deviation occurs based on a change in cell voltage deviation when ending the primary cell balancing as compared with the initial cell voltage deviation, that is, the cell voltage deviation when entering the primary cell balancing. As an example, when the cell voltage deviation when entering the primary cell balancing is less than k times the cell voltage deviation when ending the primary cell balancing, the processor 141 may be configured to determine that the abnormal cell voltage deviation occurs. When the cell voltage deviation when entering the primary cell balancing is not less than k times the cell voltage deviation when ending the primary cell balancing, the processor 141 may be configured to determine that the abnormal cell voltage deviation does not occur.

When it is identified that the primary cell balancing is not normally ended in S110, the processor 141 may be configured to reset the number of times N the cell balancing is performed to perform the operation from S100 again. For example, when the cell balancing is stopped due to occurrence of a fault or the like, the processor 141 may be configured to reset the number of times N the cell balancing is performed to determine whether it enters the primary balancing again.

When it is determined that the abnormal cell voltage deviation occurs in S120, in S130, the processor 141 may be configured to count the number of times N' the cell balancing is checked and may be configured to store first battery cell information. The processor 141 may be configured to increase the number of times N' the cell balancing is checked by +1 and may be configured to store the first battery cell information in the memory 142. The first battery cell information may comprise identification information (e.g., a cell number or the like) of a battery cell having a minimum cell voltage after the primary cell balancing.

In S140, the processor 141 may be configured to enter (N+1)th-order cell balancing. The processor 141 may be configured to detect cell voltages of the plurality of battery cells in the battery 110 when entering the (N+1)th-order cell balancing and may be configured to calculate a cell voltage deviation when entering the (N+1)th-order cell balancing using the detected cell voltages. The processor 141 may be configured to store the calculated cell voltage deviation when entering the (N+1)th-order cell balancing in the memory 142. The processor 141 may be configured to calculate an (N+1)th-order cell balancing end time based on the cell voltage deviation when entering the (N+1)th-order cell balancing and a target cell voltage deviation. Next, the processor 141 may be configured to perform the (N+1)th-order cell balancing and may be configured to initialize to check cell balancing (or diagnose an abnormal behavior of the battery 110, diagnose a progressive voltage drop, or the like).

In S150, the processor 141 may be configured to determine whether the (N+1)th-order cell balancing is normally ended. The processor 141 may be configured to compare a time when the (N+1)th-order cell balancing is completed with the calculated (N+1)th-order cell balancing end time. When the time when the (N+1)th-order cell balancing is completed is less than the calculated (N+1)th-order cell balancing end time as a result of the comparison, the processor 141 may be configured to determine that the cell balancing is abnormally ended. When the time when the (N+1)th-order cell balancing is completed is equal to the calculated (N+1)th-order cell balancing end time, the processor 141 may be configured to determine that the cell balancing is normally ended.

When the (N+1)th-order cell balancing is normally ended in S150, in S160, the processor 141 may be configured to determine whether an abnormal cell voltage deviation occurs. When the cell voltage deviation when entering the (N+1)th-order cell balancing is less than k times the cell voltage deviation when ending the (N+1)th-order cell balancing, the processor 141 may be configured to determine that the abnormal cell voltage deviation occurs. When the cell voltage deviation when entering the (N+1)th-order cell balancing is greater than k times the cell voltage deviation when ending the (N+1)th-order cell balancing, the processor 141 may be configured to determine that the abnormal cell voltage deviation does not occur.

When it is determined that the abnormal cell voltage deviation occurs in S160, in S170, the processor 141 may be configured to count the number of times N' the cell balancing is checked and may be configured to store second battery cell information. The second battery cell information may comprise identification information of a battery cell having a minimum cell voltage after the (N+1)th-order cell balancing.

When the (N+1)th-order cell balancing is abnormally ended in S150 or when it is determined that the abnormal cell voltage deviation does not occur in S160, the processor 141 may fail to count the number of times N' the cell balancing is checked.

In S180, the processor 141 may be configured to determine whether the number of times N' the cell balancing is checked is greater than the target number of times the cell balancing is checked. The target number of times the cell balancing is checked may be predefined, which may be stored in the memory 142.

When the number of times N' the cell balancing is checked is greater than the target number of times the cell balancing is checked in S180, in S190, the processor 141 may be configured to perform VdM diagnosis and vehicle control. When it is diagnosed (or determined) that the abnormal cell voltage drop occurs by means of the VdM diagnosis, the processor 141 may be configured to perform a warning output and vehicle control by means of a vehicle controller 150 of FIG. 1. The vehicle controller 150 may be configured to display a warning message and/or turn on a warning light on a cluster depending on the request of the processor 141. Furthermore, the vehicle controller 150 may be configured to limit battery performance, vehicle performance, and/or the like.

Figure 4A:
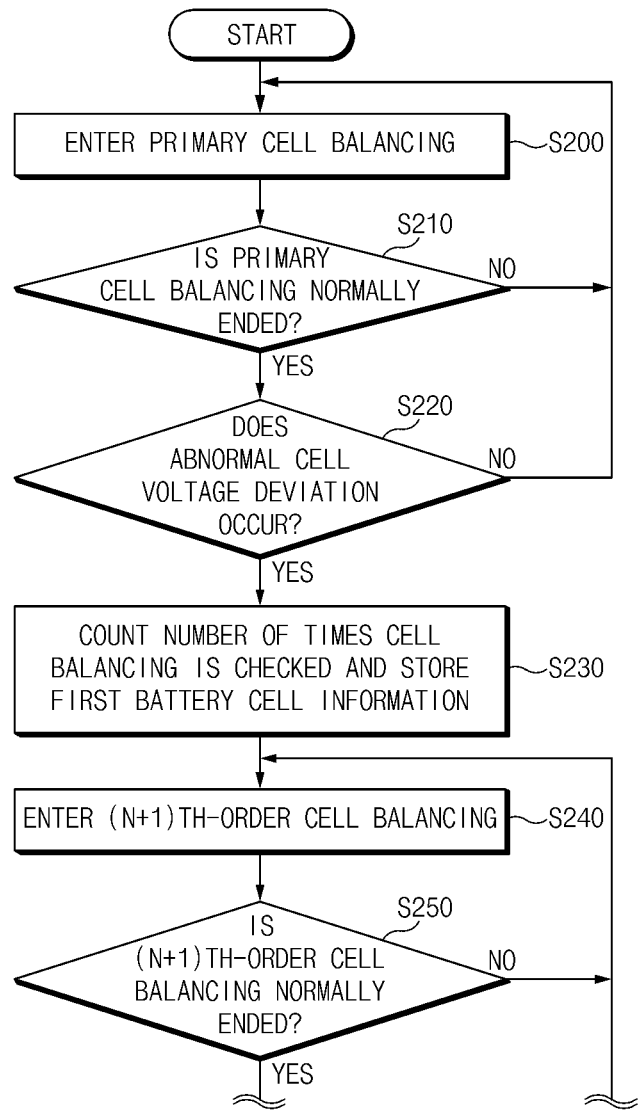
FIGS. 4A and 4B is a flowchart illustrating a method for diagnosing a battery according to another exemplary embodiment of the present disclosure.
Figure 4B:
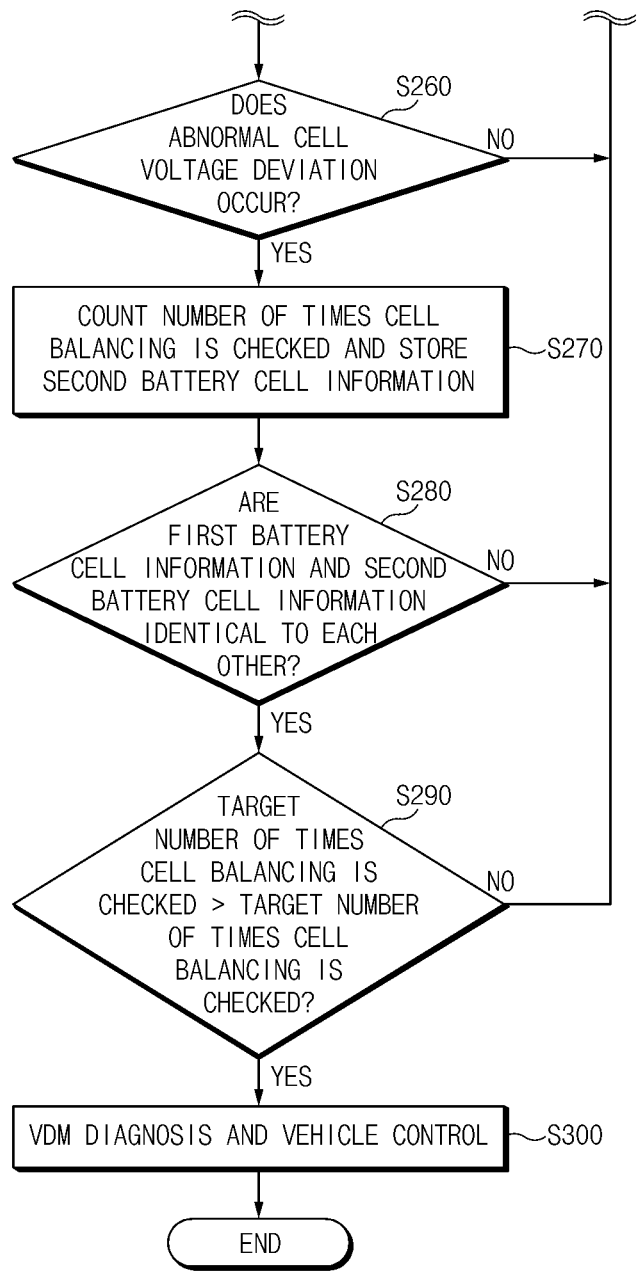

FIGS. 4A and 4B is a flowchart illustrating a method for diagnosing a battery according to another embodiment of the present disclosure.

In S200, a processor 141 of a BMS 140 of FIG. 1 may be configured to enter primary cell balancing. When a vehicle charges a battery 110 of FIG. 1 or is parked, the processor 141 may be configured to detect cell voltages of a plurality of battery cells in the battery 110. The processor 141 may be configured to calculate an initial cell voltage deviation using the detected cell voltages. For example, the processor 141 may be configured to calculate a deviation between a minimum cell voltage and a maximum cell voltage among the detected cell voltages. The processor 141 may be configured to compare the calculated initial cell voltage deviation with a reference cell voltage deviation stored in a memory 142 of FIG. 1. When the initial cell voltage deviation is greater than the reference cell voltage deviation, the processor 141 may be configured to determine to enter the primary cell balancing. When the initial cell voltage deviation is less than the reference cell voltage deviation, the processor 141 may be configured to determine not to enter the primary cell balancing. Herein, the reference cell voltage deviation may be a criterion of determining whether to enter cell balancing, which may be predetermined by a system designer. Furthermore, the processor 141 may be configured to calculate a primary cell balancing end time based on the initial cell voltage deviation when entering the primary cell balancing and a target cell voltage deviation. The target cell voltage deviation may be preset based on a test result or the like, which may be used as a criterion of determining whether the cell balancing is ended.

In S210, the processor 141 may be configured to identify whether the primary cell balancing is normally ended. When the primary cell balancing is ended in the primary cell balancing end time, the processor 141 may be configured to determine that the primary cell balancing is normally ended. When the primary cell balancing is ended before the primary cell balancing end time, the processor 141 may be configured to determine that the primary cell balancing is abnormally ended.

When it is identified that the primary cell balancing is normally ended in S210, in S220, the processor 141 may be configured to determine whether an abnormal cell voltage deviation occurs. The processor 141 may be configured to recalculate a cell voltage deviation after the primary cell balancing is normally ended. The processor 141 may be configured to determine whether the abnormal cell voltage deviation occurs based on a change in cell voltage deviation when ending the primary cell balancing as compared with the initial cell voltage deviation, that is, the cell voltage deviation when entering the primary cell balancing. When the cell voltage deviation when entering the primary cell balancing is less thank times the cell voltage deviation when ending the primary cell balancing, the processor 141 may be configured to determine that the abnormal cell voltage deviation occurs. When the cell voltage deviation when entering the primary cell balancing is not less than k times the cell voltage deviation when ending the primary cell balancing, the processor 141 may be configured to determine that the abnormal cell voltage deviation does not occur.

When it is identified that the primary cell balancing is not normally ended in S210, the processor 141 may be configured to reset the number of times N the cell balancing is performed to perform the operation from S200 again. For example, when the cell balancing is stopped due to occurrence of a fault or the like, the processor 141 may be configured to reset the number of times N the cell balancing is performed to determine whether it enters the primary balancing again.

When it is determined that the abnormal cell voltage deviation occurs in S220, in S230, the processor 141 may be configured to count the number of times N' the cell balancing is checked and may be configured to store first battery cell information. The processor 141 may be configured to increase the number of times N' the cell balancing is checked by +1 and may be configured to store the first battery cell information in the memory 142. The first battery cell information may comprise identification information (e.g., a cell number or the like) of a battery cell having a minimum cell voltage after the primary cell balancing.

In S240, the processor 141 may be configured to enter (N+1)th-order cell balancing. The processor 141 may be configured to detect cell voltages of the plurality of battery cells in the battery 110 when entering the (N+1)th-order cell balancing and may be configured to calculate a cell voltage deviation when entering the (N+1)th-order cell balancing using the detected cell voltages. The processor 141 may be configured to store the calculated cell voltage deviation when entering the (N+1)th-order cell balancing in the memory 142. The processor 141 may be configured to calculate an (N+1)th-order cell balancing end time based on the cell voltage deviation when entering the (N+1)th-order cell balancing and a target cell voltage deviation. Next, the processor 141 may be configured to perform the (N+1)th-order cell balancing and may be configured to initialize to check cell balancing (or diagnose an abnormal behavior of the battery 110, diagnose a progressive voltage drop, or the like).

In S250, the processor 141 may be configured to determine whether the (N+1)th-order cell balancing is normally ended. When a time when the (N+1)th-order cell balancing is ended is within the calculated (N+1)th-order cell balancing end time, the processor 141 may be configured to determine that the cell balancing is abnormally ended. When the (N+1)th-order cell balancing is ended in the calculated (N+1)th-order cell balancing end time, the processor 141 may be configured to determine that the cell balancing is normally ended.

When the (N+1)th-order cell balancing is normally ended in S250, in S260, the processor 141 may be configured to determine whether an abnormal cell voltage deviation occurs. When the cell voltage deviation when entering the (N+1)th-order cell balancing is less than k times the cell voltage deviation when ending the (N+1)th-order cell balancing, the processor 141 may be configured to determine that the abnormal cell voltage deviation occurs. When the cell voltage deviation when entering the (N+1)th-order cell balancing is greater than k times the cell voltage deviation when ending the (N+1)th-order cell balancing, the processor 141 may be configured to determine that the abnormal cell voltage deviation does not occur.

When it is determined that the abnormal cell voltage deviation occurs in S260, in S270, the processor 141 may be configured to count the number of times N' the cell balancing is checked and may be configured to store second battery cell information. The second battery cell information may comprise identification information of a battery cell having a minimum cell voltage after the (N+1)th-order cell balancing.

When the (N+1)th-order cell balancing is abnormally ended in S250 or when it is determined that the abnormal cell voltage deviation does not occur in S260, the processor 141 may fail to count the number of times N' the cell balancing is checked.

In S280, the processor 141 may be configured to determine whether the first battery cell information and the second battery cell information are identical to each other. The processor 141 may be configured to determine whether the battery cell having the minimum cell voltage after the primary cell balancing and the battery cell having the minimum cell voltage after the (N+1)th-order cell balancing are the same as each other. Because there are generally about one or two battery cells, each of which has a defect, when pieces of battery cell information are identical to each other, the processor 141 may be configured to distinguish (or detect) the battery cell as a bad cell.

When the first battery cell information and the second battery cell information are identical to each other in S280, in S290, the processor 141 may be configured to determine whether the number of times N' the cell balancing is checked is greater than the target number of times the cell balancing is checked. The target number of times the cell balancing is checked may be predefined, which may be stored in the memory 142.

When the number of times N' the cell balancing is checked is greater than the target number of times the cell balancing is checked in S290, in S300, the processor 141 may be configured to perform VdM diagnosis and vehicle control. When it is diagnosed (or determined) that the abnormal cell voltage drop occurs by means of the VdM diagnosis, the processor 141 may be configured to perform a warning output and vehicle control by means of a vehicle controller 150 of FIG. 1. The vehicle controller 150 may be configured to display a warning message and/or turn on a warning light on a cluster depending on the request of the processor 141. Furthermore, the vehicle controller 150 may be configured to limit battery performance, vehicle performance, and/or the like.

When the number of times N' the cell balancing is checked is not greater than the target number of times the cell balancing is checked in S290, the processor 141 may be configured to reset each of the number of times N the cell balancing is performed and the number of times N' the cell balancing is checked to "1" to repeatedly perform the operation from S240.

Embodiments of the present disclosure may previously diagnose a battery cell showing an abnormal behavior using a cell balancing function applied to balance a voltage deviation of a high voltage battery to take an action of the battery cell showing the abnormal behavior in advance, thus preventing a critical situation such as fire.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A battery management system for an electrified vehicle, the battery management system comprising:

a processor configured to:
- monitor a battery;
- perform primary cell balancing, when a battery cell voltage deviation meets a cell balancing entry condition;
- determine whether an abnormal cell voltage deviation occurs after the primary cell balancing;
- diagnose a progressive voltage drop using (N+1)th-order cell balancing, when it is determined that the abnormal cell voltage deviation occurs, and
- detect a bad cell based on a battery cell having a minimum cell voltage after the primary cell balancing and a battery cell having a minimum cell voltage after the (N+1)th-order cell balancing.

2. The battery management system of claim 1, wherein the processor is further configured to determine whether the abnormal cell voltage deviation occurs based on:
- a cell voltage deviation when entering the primary cell balancing; and
- a cell voltage deviation when ending the primary cell balancing.

3. The battery management system of claim 1, wherein the processor is further configured to determine whether the abnormal cell voltage deviation occurs based on:
- a cell voltage deviation when entering the (N+1)th-order cell balancing; and
- a cell voltage deviation when ending the (N+1)th-order cell balancing after the (N+1)th-order cell balancing.

4. The battery management system of claim 3, wherein the processor is further configured to count a number of times cell balancing is checked, when it is determined that the abnormal cell voltage deviation occurs after the (N+1)th-order cell balancing.

5. The battery management system of claim 4, wherein the processor is further configured to determine that the progressive voltage drop occurs, when the number of times the cell balancing is checked is greater than a target number of times cell balancing is checked.

6. The battery management system of claim 1, wherein the processor is further configured to:
- identify whether the battery cell having the minimum cell voltage after the primary cell balancing, and the battery cell having the minimum cell voltage after the (N+1)th-order cell balancing, are identical to each other; and
- detect a bad cell based on a result of the identifying.

7. The battery management system of claim 1, wherein the processor is further configured to output a warning, when it is diagnosed that the progressive voltage drop occurs.

8. A vehicle comprising the battery management system of claim 1.

9. The vehicle of claim 8 wherein the vehicle is an electrified vehicle.

10. A method for diagnosing a battery of a battery management system, the method comprising, by a processor:
- performing primary cell balancing, when a battery cell voltage deviation meets a cell balancing entry condition;
- determining whether an abnormal cell voltage deviation occurs after the primary cell balancing; and
- diagnosing a progressive voltage drop using (N+1)th-order cell balancing, when it is determined that the abnormal cell voltage deviation occurs, and
- wherein the diagnosing of the progressive voltage drop comprises detecting a bad cell based on a battery cell having a minimum cell voltage after the primary cell balancing and a battery cell having a minimum cell voltage after the (N+1)th-order cell balancing.

11. The method of claim 10, wherein the determining of whether the abnormal cell voltage deviation occurs after the primary cell balancing comprises:
- determining, by the processor, whether the abnormal cell voltage deviation occurs based on:
  - a cell voltage deviation when entering the primary cell balancing; and
  - a cell voltage deviation when ending the primary cell balancing.

12. The method of claim 10, wherein the diagnosing of the progressive voltage drop comprises:
- determining, by the processor, whether the abnormal cell voltage deviation occurs based on:
  - a cell voltage deviation when entering the (N+1)th-order cell balancing; and
  - a cell voltage deviation when ending the (N+1)th-order cell balancing after the (N+1)th-order cell balancing.

13. The method of claim 12, wherein the diagnosing of the progressive voltage drop comprises, by the processor:
- counting a number of times cell balancing is checked, when it is determined that the abnormal cell voltage deviation occurs after the (N+1)th-order cell balancing; and
- comparing the number of times the cell balancing is checked with a target number of times the cell balancing is checked.

14. The method of claim 13, wherein the diagnosing of the progressive voltage drop comprises:
- determining, by the processor, that the progressive voltage drop occurs, when the number of times the cell balancing is checked is greater than the target number of times the cell balancing is checked.

15. The method of claim 10, wherein the diagnosing of the progressive voltage drop comprises, by the processor:
- identifying, whether the battery cell having the minimum cell voltage after the primary cell balancing, and the battery cell having the minimum cell voltage after the (N+1)th-order cell balancing, are identical to each other; and
- detecting a bad cell based on a result of the identifying.

16. The method of claim 10, further comprising outputting, by the processor, a warning, when it is diagnosed that the progressive voltage drop occurs.

* * * * *